(No Model.)
T. TAYLOR.
TREATING COTTON SEED TO REMOVE FIBER.
No. 304,147.   Patented Aug. 26, 1884.
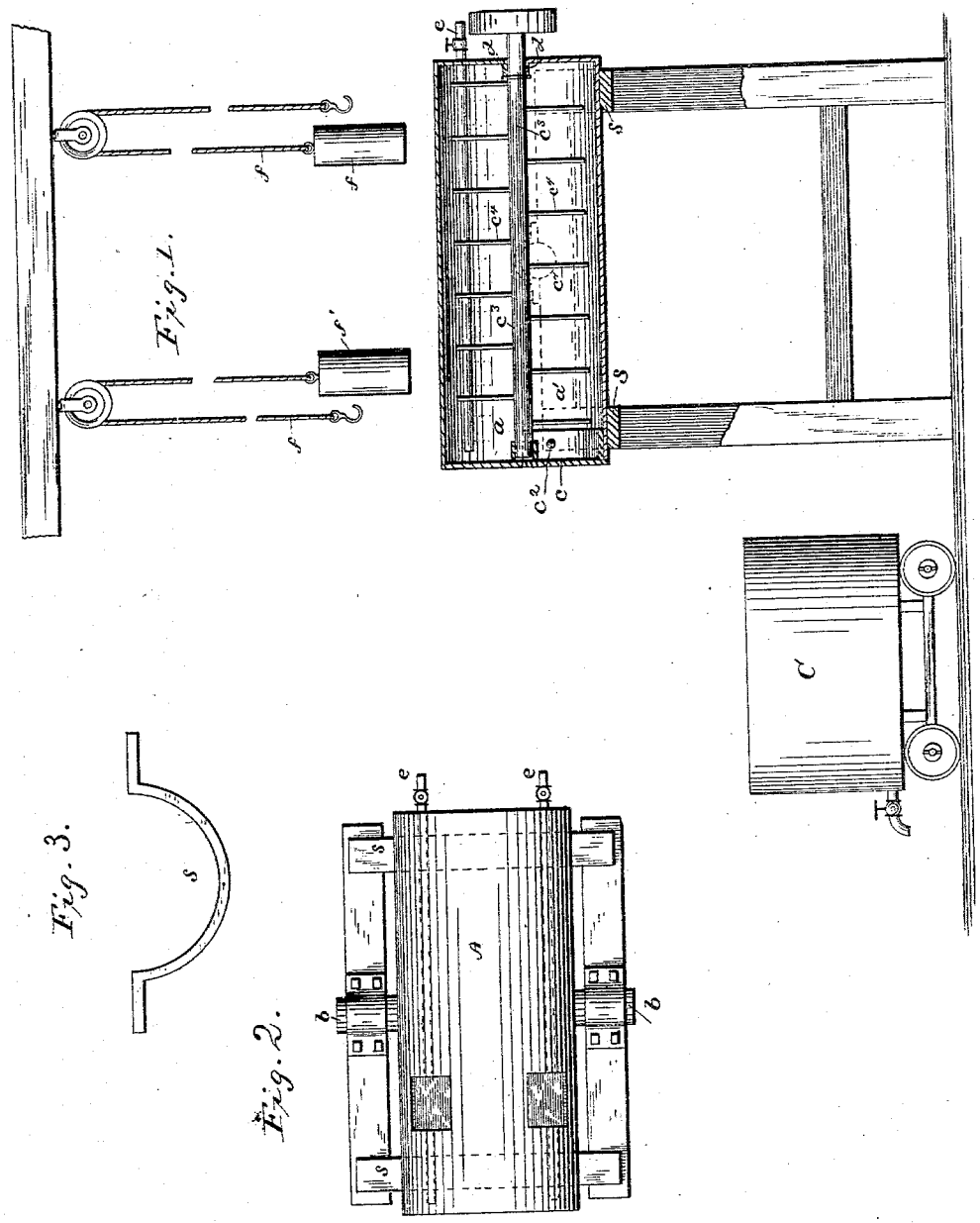
WITNESSES
Chas. R. Burr
Fred P. Church
INVENTOR
Thomas Taylor
by Church & Church
his Attorneys

United States Patent Office.

THOMAS TAYLOR, OF WASHINGTON, DISTRICT OF COLUMBIA.

TREATING COTTON-SEED TO REMOVE FIBER.

SPECIFICATION forming part of Letters Patent No. 304,147, dated August 26, 1884.

Application filed June 12, 1884. (No model.)

*To all whom it may concern:*

Be it known that I, THOMAS TAYLOR, of Washington, District of Columbia, have invented certain new and useful Improvements in Processes of Treating Cotton-Seed; and I do hereby declare the following to be a full, clear, and exact description of the same, reference being had to the accompanying drawings, forming a part of this specification, and to the figures and letters of reference marked thereon.

My present invention relates to a novel process or method of treating cotton-seed whereby the adherent lint or fiber is economically, quickly, and effectually removed, and, if desired, preserved for future use, without injury to the hull or kernel; and it consists essentially, in first moistening the fiber, then subjecting it to the action of a spray of strong sulphuric acid, and finally washing out the dissolved lint, or neutralizing the acid and then washing, all as hereinafter more fully described, and pointed out in the claims.

The most important and distinguishing characteristics of my present invention are economy in the use of acid, economy in the expenditure of time, the preservation of a low temperature, whereby the burning of the lint, and the consequent formation of charcoal, is avoided, and the seed preserved in its normal healthy condition, ready to be ground, pressed, or planted.

For the purpose of accomplishing the foregoing objects, I take any desirable quantity of the cotton-seed and subject it to the action of a fine spray of water, the seed being in the meantime rapidly turned or stirred, so that the fibers and hulls shall be uniformly moistened throughout the entire mass. After the charge has been thoroughly moistened, but not to a degree materially in excess of its absorptive capacity, I discharge upon it a spray of strong sulphuric acid of about 66° Baumé, (Norhausen sulphuric acid may be used,) at the same time continuing the stirring action, so that each portion shall be subjected to the action of the acid. The quantity of acid to be employed and the length of time the seed is to be subjected to the stirring action depends entirely upon the result sought, whether it be the destruction of the lint or its preservation for future use; but in either event but a relatively small amount of acid and a limited interval of time are requisite to prepare the seed for the complete removal of the cotton by a subsequent process without injury to the seed. When it is desired to preserve the lint, care must be taken to apply only so much acid as will combine quickly with the moisture on the fiber and surface of the seed, avoiding the presence of either free water or free acid in any material quantity, such as would develop a considerable degree of heat.

It has been found in practice that when the seeds have been treated in the manner described and agitated for a period varying from five to ten minutes only the roots or root-cells become softened or otherwise affected to such an extent that the adherent cotton-fiber can easily be removed from the seed by the fingers, and this result is attained by minimum expenditure of acid, and without producing such a degree of heat as to injuriously affect either the cotton, the hull, or the seed. Moreover, the time necessary for the operation is so brief that the coloring-matter present in the hulls is not affected to such an extent as to be dissolved out and transferred to the cotton. After the seed has been thus treated to the water and strong acid sprays, it is washed in water containing some neutralizing substance—such as the acetate of lead or an alkali—whereby the corrosive action of the acid will be prevented, and the fiber is subsequently removed by friction, preferably in water, which will leave the hull of the seed clear of all extraneous matter. The seed is next quickly dried, preferably in a revolving perforated or wire cylinder located in a hot-air chamber, and is then in condition to be used, either for planting or in the manufacture of oil. The cotton fiber which is removed by this process is remarkably free from the stains and discolorations unavoidably produced when the seed and cotton are subjected to the action of dilute sulphuric acid for any considerable length of time; hence it does not require so much bleaching. If it is not sought to preserve the fiber, it can be completely removed from the seed by simply increasing the quantity of acid as employed in the second stage of the process, and continuing the agitation for a few moments longer. In this way a saving of acid is effected at the expense of a few moments more time, and the cotton, instead of being burned or reduced to charcoal, which is difficult of separation from the sound seeds, is dissolved or converted into a gummy substance soluble in water and readily removed by washing the seed in pure water, after which they are dried.

In the accompanying drawings, Figure 1 is a side elevation of an apparatus used in carrying out my improved process, partly in section. Fig. 2 is a top plan view of the mixing-cylinder, and Fig. 3 is a side view of one of the stays for securing the mixing-cylinder in position.

Similar letters of reference in the several figures indicate the same parts.

The letter A indicates a drum constructed of or lined with some material capable of resisting the corrosive action of the acid employed. The drum is divided longitudinally into two parts, the upper section, $a$, being hinged to the lower section, $a'$, at one side, so as to be capable of being swung back to expose the interior of the drum. The lower section is provided with trunnions $b\,b$, upon which the drum is supported and tilted to discharge its contents, one head, $c$, of said lower section being flanged and sliding or resting within the section $a'$, and secured by a bolt or rod, $c^2$.

Supported in open bearings on the cross-bars $d\,d$, fastened, respectively, to one end of the section $a'$ and to the flanged head $c$, is a shaft, $c^3$, provided with radial arms or stirrers $c^4$.

The cotton-seed to be treated is placed in the drum, the upper section closed and fastened in position by any suitable device, and first water and afterward acid is sprayed upon the mass contained within the drum, while the shaft $c^3$ is rotated, keeping the material in a state of agitation, thoroughly mixing it and subjecting the entire mass to the action of the water and acid. The water and acid are introduced through the pipes $e\,e$ and delivered upon the material in the form of a fine spray, and in order that the operation may be watched by the attendant without stopping the shaft, glass or other suitable transparent panes are inserted in the upper section. The drum is sustained in a horizontal position by the removable stays $s\,s$ or other suitable means, and as soon as the operations to be performed in this mechanism are completed the drum is opened, the stirrer elevated by the chains or ropes $f\,f$ and counter-weights $f'\,f'$, the head removed, one of the stays $s$ withdrawn, and the treated seed is dumped into the vat C, where it is washed and the acid neutralized, if desired.

I am aware that it is not new to treat cotton-seed to an acid bath for the purpose of loosening or removing the fiber; but so far as I am aware in every such case there has been involved a large expenditure of acid in proportion to the material, and a relatively-great length of time has been consumed, and whenever the process has been expedited and the acid diluted it has always been accompanied by the development or application of sufficient heat to burn or char the cotton, forming charcoal, which, being mixed with or adhering to the seed, requires special mechanism for its removal, and interferes seriously with the process, inasmuch as it forms with the seed a pasty mass insoluble in water. Moreover, the temperature at which the process is carried on is so high as to injuriously affect the seed, rupturing or otherwise affecting the seed-germs and oil-cells.

By the process herein described the expenditure of acid and time are reduced to a minimum, and the cotton is entirely removed whether it is to be preserved or destroyed, without in any manner injuring the seed either for planting or for use in the manufacture of oil or seed cake.

Having thus described my invention, what I claim as new, and desire to secure by Letters Patent, is—

1. The hereinbefore-described improvement in the art of treating cotton-seed for the removal of the adherent lint, which consists in first moistening the fiber and subsequently subjecting the moist cotton to the action of a spray of strong sulphuric acid, substantially as described.

2. The hereinbefore-described improvement in the art of treating cotton-seed, which consists in first moistening the fiber and hulls, and then subjecting the moistened mass to the action of a spray of strong sulphuric acid and agitating, substantially as and for the purpose set forth.

3. The hereinbefore-described improvement in the art of treating cotton-seed, which consists in first dampening the seed and fiber and then subjecting the same to the simultaneous action of an agitator and a spray of strong sulphuric acid, and finally washing the mass so treated and drying the seed, substantially as described.

THOMAS TAYLOR.

Witnesses:
J. B. CHURCH,
A. S. STEWART.